United States Patent
Hong

(10) Patent No.: US 12,317,145 B2
(45) Date of Patent: May 27, 2025

(54) COMMUNICATION METHODS AND APPARATUSES, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 394 days.

(21) Appl. No.: 18/016,816

(22) PCT Filed: Aug. 19, 2020

(86) PCT No.: PCT/CN2020/110109
§ 371 (c)(1),
(2) Date: Jan. 18, 2023

(87) PCT Pub. No.: WO2022/036610
PCT Pub. Date: Feb. 24, 2022

(65) Prior Publication Data
US 2024/0040449 A1    Feb. 1, 2024

(51) Int. Cl.
*H04W 36/00* (2009.01)
(52) U.S. Cl.
CPC .............. *H04W 36/008357* (2023.05); *H04W 36/0016* (2013.01); *H04W 36/0058* (2018.08)
(58) Field of Classification Search
CPC ..... H04W 36/008357; H04W 36/0016; H04W 36/0058; H04W 36/0064
See application file for complete search history.

(56) References Cited

U.S. PATENT DOCUMENTS

| 7,657,652 B1 * | 2/2010 | Balaji ................ G06F 16/9577 709/201 |
| 2015/0271228 A1 * | 9/2015 | Lam ....................... H04L 69/24 709/203 |
| 2016/0142951 A1 * | 5/2016 | Balasubramanian ........................ H04W 36/0033 370/331 |

FOREIGN PATENT DOCUMENTS

| CN | 103533587 A | * | 1/2014 |
| CN | 106507318 A | | 3/2017 |
| EP | 3399797 A1 | | 11/2018 |
| WO | WO 2019214448 A1 | | 11/2019 |

OTHER PUBLICATIONS

PCT/CN2020/110109 English translation of International Search Report dated Jun. 1, 2021, 2 pages.
(Continued)

*Primary Examiner* — Hashim S Bhatti
(74) *Attorney, Agent, or Firm* — Cozen O'Connor

(57) ABSTRACT

A communication method performed by user equipment (UE) includes receiving first control information sent by a source base station. The first control information is configured to indicate a multi-modal service parameter of a multi-modal service that a target base station supports the UE to hand over to access the target base station to perform. A communication method performed by a source base station includes sending multi-modal service handover information to a target base station; wherein the multi-modal service handover information is configured to determine a multi-modal service parameter of a multi-modal service performed by user equipment (UE) and associated with the target base station.

14 Claims, 6 Drawing Sheets

(56) References Cited

OTHER PUBLICATIONS

European Patent Application No. 20949821.1, Search and Opinion dated Apr. 22, 2024, 13 pages.

* cited by examiner receive first control information sent by the source base station — S11 send multi-modal service handover information to the target base station — S21

COMMUNICATION METHODS AND APPARATUSES, AND STORAGE MEDIUM

CROSS-REFERENCE TO RELATED APPLICATION

This application is a U.S. national phase application of International Application No. PCT/CN2020/110109, filed on Aug. 19, 2020, the content of which is hereby incorporated by reference in its entirety for all purposes.

TECHNICAL FIELD

The disclosure relates to the field of wireless communication technologies, and in particular, to communication methods, communication devices, and storage media.

BACKGROUND

With the continuous development of communication technology, the 6G communication technology has been studies around the world. In the 6G communication technology, smart interaction is an important communication application scenario.

In the related art, smart interaction mostly relies on passive inputs and needs to perform operations according to input requirements, and most of the input requirements are unimodal. However, more attention are paid on the multi-modal function in the new generation of communication technologies.

SUMMARY

According to a first aspect of the disclosure, a communication method performed by user equipment (UE) is provided. The method includes:
  receiving first control information sent by a source base station, in which the first control information is configured to indicate the first control information is configured to indicate a multi-modal service parameter of a multi-modal service, in which a target base station supports a handover from the source base station to the target base station for the UE to perform the multi-modal service.

According to a second aspect of the disclosure, a communication method performed by a source base station is provided. The method includes:
  sending multi-modal service handover information to a target base station; in which the multi-modal service handover information is configured to determine a multi-modal service parameter of a multi-modal service performed by user equipment (UE) and associated with the target base station.

According to a third aspect of the disclosure, a communication method performed by a target base station is provided. The method includes:
  receiving multi-modal service handover information sent by a source base station; in which the multi-modal service handover information is configured to determine a multi-modal service parameter of a multi-modal service performed by user equipment (UE) and associated with a target base station; and sending multi-modal service response information.

According to a fourth aspect of the disclosure, a communication device is provided. The device includes:
  a processor; and a memory for storing instructions executable by the processor; in which the processor is configured to: perform the communication method according to the first aspect or any one of the implementations of the first aspect.

According to a fifth aspect of the disclosure, a communication device is provided. The device includes:
  a processor; and a memory for storing instructions executable by the processor; in which the processor is configured to: perform the communication method according to the second aspect or any one of the implementations of the second aspect.

According to a sixth aspect of the disclosure, a communication device is provided. The device includes:
  a processor; and a memory for storing instructions executable by the processor; in which the processor is configured to: perform the communication method according to the third aspect or any one of the implementations of the third aspect.

It is understandable that the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Embodiments will be described in detail herein, examples of which are illustrated in the accompanying drawings. Where the following description refers to the drawings, the same numerals in different drawings refer to the same or similar elements unless otherwise indicated. The implementations described in the illustrative examples below are not intended to represent all implementations consistent with this disclosure. Rather, they are merely examples of devices and methods consistent with some aspects of the disclosure as recited in the appended claims.

With the continuous development and commercial use of the communication technologies, new communication technologies are constantly being researched around the world, and research on a new generation of communication technologies (such as the 6G communication technology) has now begun. In the new generation of communication technology, smart interaction is a key application scenario. The smart interaction is the intelligent interaction between agents (such as UE and network device), and more attention will be paid on the multi-modality. The definition of multi-modality is very broad. For example, the multi-modality can be sending inputs from multiple UEs or multiple inputs from the same UE to a centralized processing device or function to comprehensively process the above inputs to obtain outputs meeting requirements of different UEs or multiple outputs of the same UE. The multiple outputs obtained through the multi-modal processing may also be multiple outputs corresponding to multiple UEs or multiple outputs corresponding to one UE. Certainly, with the evolution of technology, there may be other definitions of the multi-modality, which are difficult to list in embodiments of the disclosure. All the above descriptions are only examples, rather than exhaustive examples of related technologies for the multi-modality.

As described above, in the new generation of communication technology, the network-side devices (e.g., the base stations) need to support multi-modal service functions, and different network-side devices need to support different types of multi-modal functions. However, in related arts, especially in cellular networks, smart/intelligence interactions mostly rely on passive single-modal input, such as voice interactions between users and smart homes, or visual interactions between users and smart homes. The input of these smart/intelligence interactions are all unimodal inputs inputted by the user, the device provides outputs according to the user's input requirements, and the device intelligently supports unimodal inputs or outputs. Therefore, based on the technical problems involved in the above embodiments, the disclosure provides communication methods.

Figures 1, 2, 3:
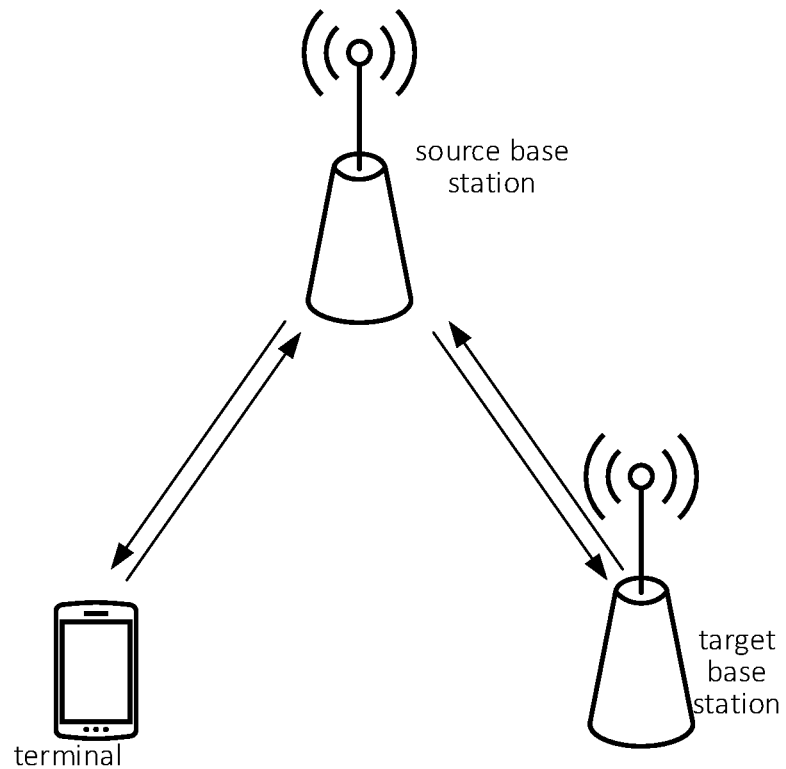
FIG. 1 is an architectural diagram illustrating a communication system between a network device and a terminal according to some embodiments.
FIG. 2 is a flowchart illustrating a communication method performed by a user equipment according to some embodiments.
FIG. 3 is a flowchart illustrating another communication method performed by a base station according to some embodiments.

FIG. 1 is an architectural diagram illustrating a communication system between a network device and user equipment (UE) according to some embodiments. The communication method according to the disclosure can be performed by a communication system illustrated in the architecture diagram of FIG. 1. As illustrated in FIG. 1, the UE sends measurement information to a source base station, the source base station determines, based on the measurement information reported by the terminal, the information about a multi-modal service that is being performed and sends the determined information of the multi-modal service that is being performed by the UE to a target base station, and the target base station determines whether to support the multi-modal communication that is being performed by the UE according to the received information of the multi-modal communication and sends to the source base station the information indicating that the target base station supports the multi-modal service that is being performed by the UE or the information indicating that the target base station does not support the multi-modal service that is being performed by the UE. Therefore, it is determined whether the serving base station of the UE can be handed over from the source base station to the target base station.

It is understandable that the communication system between the network device and the terminal illustrated in FIG. 1 is only a schematic illustration, and the wireless communication system may also include other network devices, such as a core network device, a wireless relay device, or a wireless backhaul device, which are not illustrated in FIG. 1. Embodiments of the disclosure do not limit the number of network devices and the number of terminals included in the wireless communication system.

It is further understandable that the wireless communication system according to embodiments of the disclosure is a network that provides a wireless communication function. The wireless communication system can employ different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), Carrier Sense Multiple Access with Collision Avoidance. According to the capacity, speed, delay and other factors of different networks, the network can be divided into 2 generation (2G) network, 3G network, 4G network or future evolution network, such as 5G network. The 5G network can also be called New Radio (NR). For convenience of description, the disclosure will sometimes refer to the wireless communication network simply as network.

Further, the network devices involved in the disclosure may also be referred to as radio access network devices. The wireless access network device may be: a base station, an evolved node B, a home base station, an access point (AP) in a wireless fidelity (WIFI) system, a wireless relay node, a wireless backhaul node, a transmission point (TP) or a transmission and reception point (TRP), etc., or can also be a gNB in an NR system, or can also be a component or part of a device that constitutes a base station. In a vehicle-to-everything (V2X) communication system, the network device may be an in-vehicle device. It is understandable that, in embodiments of the disclosure, the specific technology and specific device form adopted by the network device are not limited.

Further, the terminal involved in the disclosure may also be referred to as terminal device, user equipment (UE), mobile station (MS), mobile terminal (MT), etc., which is a device that provides voice and/or data connectivity. For example, the terminal may be a handheld device with wireless connectivity, a vehicle-mounted device, or the like. At present, some examples of terminals are: Mobile Phone, Pocket Personal Computer (PPC), palmtop computer, Personal Digital Assistant (PDA), notebook computer, tablet computer, wearable device, in-vehicle device, etc. In addition, in the vehicle-to-everything (V2X) communication system, the terminal device may also be an in-vehicle device. It is understandable that the specific technology and specific device form adopted by the terminal are not limited in embodiments of the disclosure.

In some embodiments of the disclosure, a communication method is provided.

FIG. 2 is a flowchart illustrating a communication method according to some embodiments. As illustrated in FIG. 2, the communication method is performed by user equipment (UE). The method includes the following.

In block S11, first control information sent by a source base station is received.

The source base station is a current serving base station for the UE. The first control information is configured to indicate a multi-modal service parameter of a multi-modal service that a target base station supports the UE to hand over to access the target base station to perform. The multi-modal service parameter of the multi-modal service that the target base station supports the UE to hand over to access the target base station to perform can include the multi-modal service parameters of all multi-modal services performed by the UE or the multi-modal service parameters of part of the multi-modal services performed by the UE. In some embodiments of the disclosure, in response to receiving the first control information sent by the source base station, the UE determines that the serving base station for the UE is handed over from the source base station to the target base station. In addition, the multi-modal service that the target base station supports the UE to hand over to access the target base station to perform is determined based on the first control information, and all or part of the multi-modal services performed by the UE that are determined to hand over to the target base station are switched to the target base station.

In some embodiments of the disclosure, the UE may measure base stations other than the source base station according to a configuration from the source base station. When a base station other than the source base station meets a measurement reporting condition set by the source base station, measurement reporting information is sent to the source base station. In this disclosure, the base station other than the source base station that satisfies the measurement reporting condition set by the source base station is the target base station, such that the measurement reporting information at least includes information configured to indicate one or more target base stations that satisfy the measurement reporting trigger condition. For example, when the UE finds that the signal strength(s) of one or more base stations among the base stations other than the source base station meet the handover condition, each of the one or more base stations that meet the handover condition is regarded as the target base station, and the information of the one or more target base stations is reported to the source base station. It is noteworthy that when the target base station satisfies the signal strength handover condition, the information of the target base station is reported to the source base station. At this time, it cannot be determined whether the target base station supports the multi-modal service performed by the UE or does not support the multi-modal service performed by the UE. The measurement reporting trigger condition includes finding a target base station satisfying the handover condition.

In some embodiments of the disclosure, the first control information sent by the source base station is determined by the source base station based on multi-modal service response information from the target base station. The multi-modal service response information from the target base station is determined by the target base station based on the received multi-modal service handover information sent by the source base station. The multi-modal service handover information is sent by the source base station when the source base station determines to hand over the base station for the UE performing the multi-modal service. The UE receives the first control information sent by the source base station, determines the multi-modal service parameters of the target base station, and determines whether the target base station supports the multi-modal service performed by the UE or not support the multi-modal service performed by the UE. When the multi-modal service parameters of the target base station indicated by the first control information received by the UE include the multi-modal service parameter of the terminal or part of the multi-modal service parameter of the terminal, it is determined that the target base station supports the multi-modal service performed by the terminal or the target base station supports part of the multi-modal service performed by the terminal. When the multi-modal service parameters of the target base station indicated by the first control information received by the UE do not include any multi-modal service parameter of the terminal, it is determined that the target base station does not support the multi-modal service performed by the terminal.

In some embodiments of the disclosure, the UE sends the measurement reporting information to the source base station in response to determining that a target base station meets the measurement reporting condition (e.g., measurement based on signal strength) set by the source base station. The UE further requests the source base station to determine whether the target base station supports the multi-modal service performed by the UE or not. When it is determined that the target base station supports the multi-modal service, the source base station sends the first control information to notify the UE of the multi-modal service supported by the target base station, and the implementation manner is described above. In some embodiments of the disclosure, when the UE does not receive the first control information, it is determined that the target base station does not support the multi-modal service. Alternatively, in some embodiments of the disclosure, the second control information sent by the source base station is received, and it is determined that at least one target base station does not support the multi-modal service. The second control information is configured to indicate that at least one target base station does not support the multi-modal service. As an example, the second control information may include one or more support degrees that one or more target base stations support the multi-modal service. As another example, the second control information may include support degrees of one or more different multi-modal services. Therefore, when the UE does not receive the first control information sent by the source base station or receives the second control information sent by the source base station, it is determined that at least one target base station does not support the multi-modal service performed by the UE, and the multi-modal service is continued to be performed by the previous serving base station at that time. In other words, the handover between the source base station and the target base station is not performed.

The multi-modal service handover information sent by the source base station at least includes a handover request signaling (Handover Request) for the UE to perform a multi-modal service handover.

In some embodiments of the disclosure, the source base station may send multi-modal service handover information (e.g., the handover request signaling) based on the Xn interface. In addition, the handover request signaling may further include UE context information (UEContextInformation), where the UEContextInformation at least includes a signaling element configured to instruct the UE to perform the multi-modal service. For example, a new information element (IE) is added to the UEContextInformation, where the new IE is configured to characterize parameters that the UE performs the multi-modal service.

Alternatively, the handover request signaling may further include handover preparation information (HandoverPreparationInformation), where the HandoverPreparationInformation at least includes a signaling element configured to instruct the UE to perform the multi-modal service. For example, a new information element (IE) is added to the HandoverPreparationInformation, where the new IE is configured to characterize parameters that the UE performs the multi-modal service.

The multi-modal service response information sent by the target base station at least includes a handover response identifier configured to indicate at least one multi-modal service supported by the target base station. The multi-modal service response information further at least includes: handover request acknowledge information (HANDOVER REQUEST ACKNOWLEDGE) configured to indicate that the target base station supports the multi-modal service, and the multi-modal service response information also includes information configured to indicate one or more types of one or more multi-modal services performed by the UE and supported by the target base station. The multi-modal service response information further at least includes handover preparation failure information (HANDOVER PREPARATION FAILURE) configured to indicate that the target base station does not support the multi-modal service performed by the UE. The first control information sent by the source base station is radio resource control reconfiguration (RRCReconfiguration) information.

Based on the same or similar concepts, embodiments of the disclosure also provide a communication method.

FIG. 3 is a flowchart illustrating a communication method according to some embodiments. As illustrated in FIG. 3, the communication method is performed by a source base station. The method includes the following.

In block S21, multi-modal service handover information is sent to a target base station.

The multi-modal service handover information is configured to determine a multi-modal service parameter of a multi-modal service performed by UE and associated with a target base station. In response to receiving multi-modal service response information sent by the target base station, the first control information is sent to the UE. The first control information is configured to indicate a multi-modal service parameter of a multi-modal service that the target base station supports the UE to hand over to access the target base station to perform.

In some embodiment of the disclosure, the source base station sends the multi-modal service handover information to the target base station satisfying the handover condition, and informs the target base station of the multi-modal service performed by the terminal through the sent multi-modal service handover information. After the multi-modal service handover information is sent to the target base station, the multi-modal service response information sent by the target base station is received, and the multi-modal service that the target base station supports the UE to perform is determined. The multi-modal service supported by the target base station may include all multi-modal services performed by the UE or part of the multi-modal services performed by the UE. The target base station informs, based on the multi-modal service response information, the source base station of the multi-modal service parameter of the multi-modal service that the target base station supports to hand over to the target base station to perform. The source base station determines the multi-modal service parameter of the multi-modal service that can be switched to the target base station, sends the first control information to the UE to inform the serving base station of the UE to hand over the serving base station, and controls to switch all multi-modal services or part of multi-modal services performed by the UE to the target base station.

In some embodiments of the disclosure, the UE may measure base stations other than the source base station according to a configuration from the source base station. When the base stations other than the source base station meet a measurement reporting condition set by the source base station, measurement reporting information is sent to the source base station. In this disclosure, the base stations other than the source base station that satisfy the measurement reporting condition set by the source base station are the target base stations, and the measurement reporting information at least includes information configured to indicate one or more target base stations that satisfy the measurement reporting trigger condition. For example, when the UE finds that the signal strength(s) of one or more base stations among the base stations other than the source base station meet the handover condition, each of the one or more base stations that meet the handover condition is regarded as the target base station, and the information of the one or more target base stations is reported to the source base station. It is noteworthy that when the target base station satisfies the signal strength handover condition, the information of the target base station is reported to the source base station. At this time, it cannot be determined whether the target base station supports the multi-modal service performed by the UE or does not support the multi-modal service performed by the UE. The source base station determines the information of the target base station(s) based on the measurement reporting information sent by the UE. The measurement reporting trigger condition includes finding a target base station satisfying the handover condition.

In some embodiments of the disclosure, the multi-modal service response information sent by the target base station and received by the source base station is determined by the target base station based on the received multi-modal service handover information sent by the source base station.

The multi-modal service handover information sent by the source base station at least includes a handover request signaling (Handover Request) for the UE to perform a multi-modal service handover. The handover request signaling at least includes UE context information (UEContextInformation), where the UEContextInformation at least includes a signaling element configured to instruct the UE to perform the multi-modal service. For example, a new information element (IE) is added to the UEContextInformation, where the new IE is configured to characterize parameters that the UE performs the multi-modal service. Alternatively, the handover request signaling may further include handover preparation information (HandoverPreparationInformation), where the HandoverPreparationInformation at least includes a signaling element configured to instruct the UE to perform the multi-modal service. For example, a new information element (IE) is added to the HandoverPreparationInformation, where the new IE is configured to characterize parameters that the UE performs the multi-modal service. The multi-modal service response information at least includes a handover response identifier configured to indicate the multi-modal service supported by the target base station.

In some embodiments of the disclosure, the multi-modal service response information at least includes handover request acknowledge information (HANDOVER REQUEST ACKNOWLEDGE) configured to indicate that the target base station supports the multi-modal service, and the multi-modal service response information also includes information configured to indicate one or more types of one or more multi-modal services supported by the target base station. The multi-modal service response information at least includes handover preparation failure information (HANDOVER PREPARATION FAILURE) configured to indicate that the target base station does not support the multi-modal service performed by the UE. The first control information sent by the source base station is radio resource control reconfiguration (RRCReconfiguration) information.

In some embodiments of the disclosure, the measurement reporting information sent by the UE in response to determining that the target base station satisfies the measurement reporting condition (e.g., the measurement based on signal strength) set by the source base station is received. It also needs to determine whether the target base station supports the multi-modal service performed by the UE. When it is determined that the target base station supports the multi-modal service, the source base station sends the first control information to the UE to notify the UE of the multi-modal services supported by the target base station, and the implementation manner is described above. In some embodiments of the disclosure, when it is determined that the target base station does not support the multi-modal service, the first control information may not be sent to the UE. Alternatively, in other embodiments of the disclosure, when it is determined that the target base station does not support multi-modal service, the second control information may be sent to the UE, so that the UE determines that the target base station does not support multi-modal service. The second control information is configured to indicate that at least one target base station does not support the multi-modal service. As an example, the second control information may include support degrees that one or more target base stations support the multi-modal service. As another example, the second control information may include support degrees of one or more different multi-modal services.

Based on the same or similar concepts, embodiments of the disclosure also provide a communication method.

Figure 4:
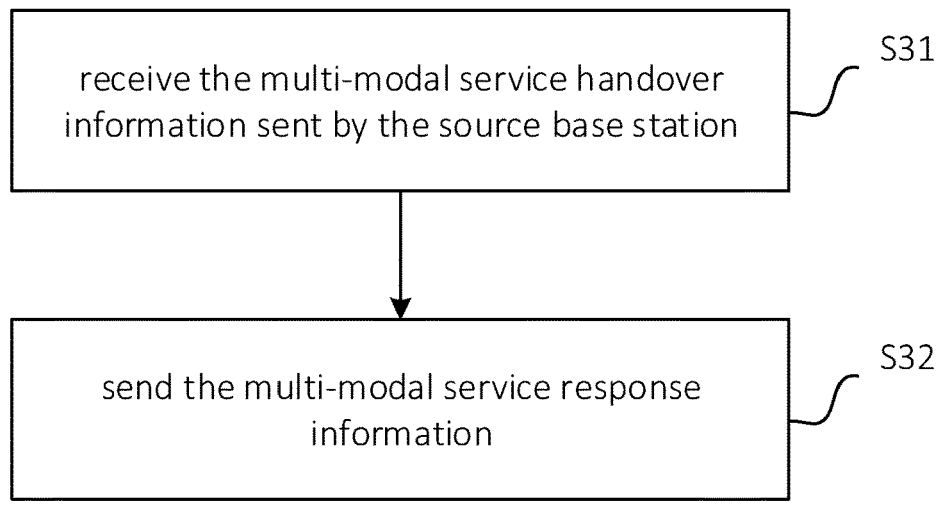
FIG. 4 is a flowchart illustrating yet another communication method performed by a base station according to some embodiments.

FIG. 4 is a flowchart illustrating a communication method according to some embodiments. As illustrated in FIG. 4, the communication method is performed by a target base station. The method includes the following.

In block S31, multi-modal service handover information sent by a source base station is received.

In block S32, multi-modal service response information is sent.

The multi-modal service handover information is configured to determine a multi-modal service parameter of a multi-modal service performed by UE and associated with a target base station.

In some embodiments of the disclosure, the target base station receives the multi-modal service handover information sent by the source base station, determines a multi-modal service parameter performed by the UE in the multi-modal service handover information, and determines a multi-modal service performed by the UE. The target base station determines, based on multi-modal services supported by itself, that part or all of the multi-modal services performed by the UE are supported by the target base station, and sends the multi-modal service parameter of the multi-modal service performed by the UE and supported by the target base station to the source base station through the multi-modal service response information. Alternatively, the target base station determines, based on multi-modal services supported by itself, that the target base station does not support the multi-modal service performed by the UE, and sends the information that the target base station does not support the multi-modal service performed by the UE to the source base station through the multi-modal service response information.

In some embodiments of the disclosure, the multi-modal service handover information sent by the source base station at least includes a handover request signaling (Handover Request) for the UE to perform a multi-modal service handover.

The multi-modal service handover information sent by the source base station at least includes a handover request signaling (Handover Request) for the UE to perform the multi-modal service handover. The handover request signaling (Handover Request) at least includes UE context information (UEContextInformation), where the UEContextInformation at least includes a signaling element configured to instruct the UE to perform the multi-modal service. Alternatively, the handover request signaling at least includes handover preparation information (HandoverPreparationInformation), where the HandoverPreparationInformation at least includes a signaling element configured to instruct the UE to perform the multi-modal service. The multi-modal service response information at least includes a handover response identifier configured to indicate the multi-modal service supported by the target base station.

In some embodiments of the disclosure, the multi-modal service response information at least includes handover request acknowledge information (HANDOVER REQUEST ACKNOWLEDGE) configured to indicate that the target base station supports the multi-modal service, and the multi-modal service response information also includes information configured to indicate one or more types of one or more multi-modal services supported by the target base station. The multi-modal service response information at least includes handover preparation failure information (HANDOVER PREPARATION FAILURE) configured to indicate that the target base station does not support the multi-modal service performed by the UE.

In some embodiments of the disclosure, the interaction process between the UE, the source base station, and the target base station is described as follows.

Figure 5:
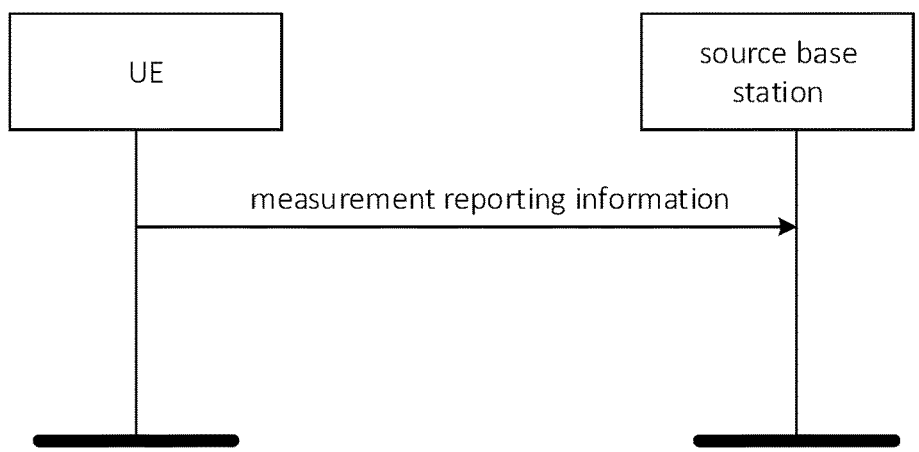
FIG. 5 is a schematic diagram illustrating the interaction between user equipment (UE) and a source base station in a communication method according to some embodiments.

During the moving process, the UE measures the base stations other than the source base station based on the configuration from the source base station. FIG. 5 is a schematic diagram illustrating the interaction between the UE and the source base station in a communication method according to some embodiments. As illustrated in FIG. 5, after the base stations other than the source base station satisfy the measurement reporting condition set by the source base station, the measurement reporting information is sent to the source base station. In this disclosure, the base stations other than the source base station that satisfy the measurement reporting condition set by the source base station are the target base stations, and the measurement reporting information at least includes information configured to indicate one or more target base stations that satisfy the measurement reporting trigger condition. For example, when the UE finds that the signal strength of a base station among the base stations other than the source base station meets the handover condition, the base station that meets the handover condition is regarded as the target base station, and the information of the target base station is reported to the source base station. It is noteworthy that when a target base station satisfies the signal strength handover condition, the information of the target base station is reported to the source base station. At this time, it cannot be determined whether the target base station supports the multi-modal service performed by the UE or does not support the multi-modal service performed by the UE. The measurement reporting trigger condition includes finding a target base station that meets the handover condition.

The source base station determines the information of the target base station after receiving the measurement report information sent by the UE, and sends the multi-modal service handover information to the target base station. The multi-modal service handover information sent by the source base station at least includes a handover request signaling (Handover Request) for the UE to perform the multi-modal service handover. The handover request signaling (Handover Request) at least includes UE context information (UEContextInformation), where the UEContextInformation at least includes a signaling element configured to instruct the UE to perform the multi-modal service. For example, a new information element (IE) is added to the UEContextInformation, where the new IE is configured to characterize parameters that the UE performs the multi-modal service. Alternatively, the handover request signaling (Handover Request) at least includes handover preparation information (Handover Preparation Information), where the Handover Preparation Information at least includes a signaling element configured to instruct the UE to perform the multi-modal service. For example, a new IE is added to the Handover Preparation Information, where the new IE is configured to characterize parameters that the UE performs the multi-modal service. The multi-modal service response information at least includes a handover response identifier configured to indicate the multi-modal service supported by the target base station.

Figure 6:
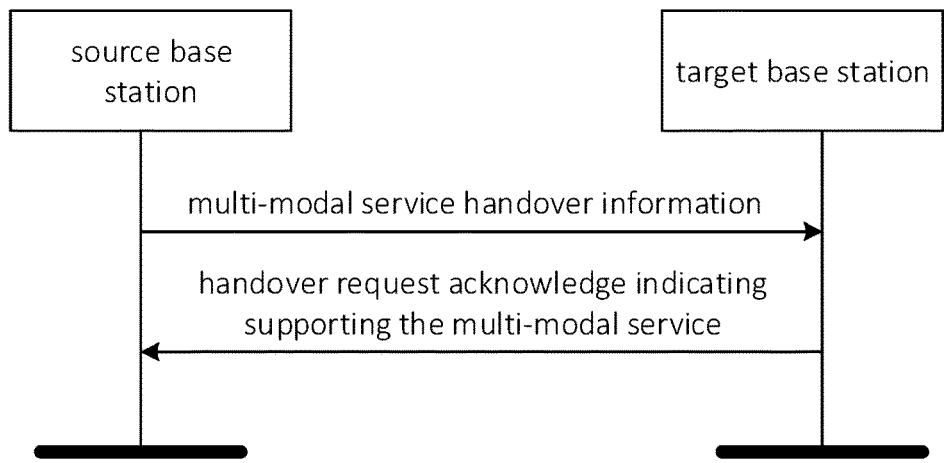
FIG. 6 is a schematic diagram illustrating the interaction between a source base station and a target base station in a communication method according to some embodiments.
Figure 7:
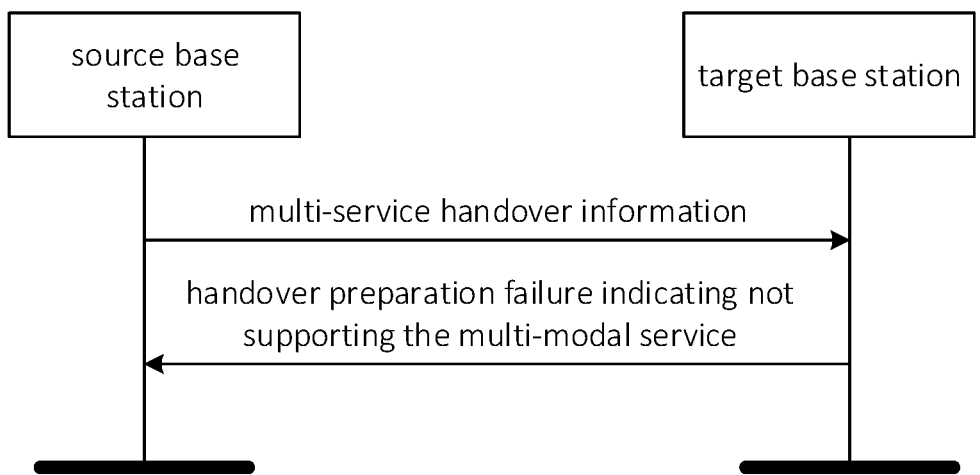
FIG. 7 is a schematic diagram illustrating the interaction between a source base station and a target base station in a communication method according to some embodiments.

The target base station receives the multi-modal service handover information sent by the source base station, determines the multi-modal service parameter performed by the UE in the multi-modal service handover information, and determines the multi-modal service performed by the UE. The target base station determines, based on the multi-modal services supported by itself, that part or all of the multi-modal services performed by the user equipment UE can be supported by the target base station. FIG. 6 is a schematic diagram illustrating the interaction between the source base station and the target base station in a communication method according to some embodiments. As illustrated in FIG. 6, the multi-modal service parameter of the multi-modal service that the UE is supported to perform is sent to the source base station through the multi-modal service response information. Alternatively, FIG. 7 is a schematic diagram illustrating the interaction between the source base station and the target base station in a communication method according to some embodiments. As illustrated in FIG. 7, the target based station determines, based on the multi-modal services supported by itself, the multi-modal services that the target base station does not support the UE to perform, and sends the information of the multi-modal service that the target base station does not support the UE to perform to the source base station through the multi-modal service response information.

The multi-modal service response information at least includes HANDOVER REQUEST ACKNOWLEDGE configured to indicate that the target base station supports the multi-modal service, and the multi-modal service response information further includes information configured to indicate one or more types of one or more multi-modal services supported by the target base station. The multi-modal service response information at least includes HANDOVER PREPARATION FAILURE configured to indicate that the target base station does not support the multi-modal service.

Figure 8:
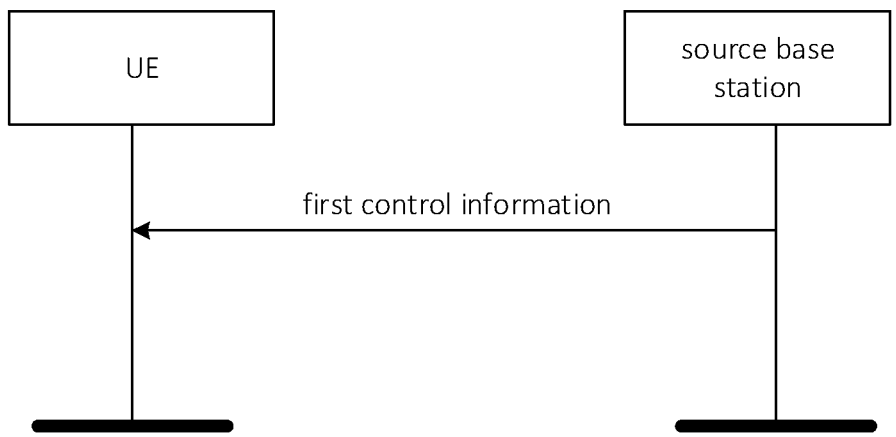
FIG. 8 is a schematic diagram illustrating the interaction between user equipment (UE) and a source base station in a communication method according to some embodiments.

The source base station receives the multi-modal service response information sent by the target base station, and determines the multi-modal service that the target base station supports the UE to perform. The multi-modal service supported by the target base station may include all multi-modal services performed by the UE or part of the multi-modal services performed by the UE. The target base station informs the source base station of the multi-modal service parameter of the multi-modal service that the target base station supports the UE to hand over to access the target base station to perform through the multi-modal service response information. The source base station determines the multi-modal service parameter of the multi-modal service that can be switched to the target base station to perform, and sends the first control information to the UE. FIG. 8 is a schematic diagram illustrating the interaction between the UE and the source base station in a communication method according to some embodiments. As illustrated in FIG. 8, the source base station sends the first control information to the UE to inform the serving base station of the UE to hand over the serving base station, and controls to switch all or part of the multi-modal services performed by the UE to the target base station.

In some embodiments of the disclosure, the source base station receives the multi-modal service response information sent by the target base station, determines the multi-modal services that the target base station does not support the UE to perform, and does not send the first control information to the UE. In other embodiments of the disclosure, the multi-modal services that the target base station does not support the UE to perform are determined and the second control information is sent to the UE to notify the UE that at least one target base station does not support the multi-mode service. The second control information is configured to indicate that at least one target base station does not support the multi-modal service. As an example, the second control information may include support degrees that one or more target base stations support the multi-modal services. As another example, the second control information may include support degrees of one or more different multi-modal services. When the UE receives the second control information sent by the source base station, it is determined that at least one target base station does not support the multi-modal service performed by the UE.

Based on the same concept, embodiments of the disclosure also provide communication apparatuses.

It is understandable that, in order to implement the above-mentioned functions, the handover apparatuses according to embodiments of the disclosure include corresponding hardware structures and/or software modules for executing each function. Combining with the units and algorithm steps of each example disclosed in the embodiments of the disclosure, embodiments of the disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the disclosure.

Figure 9:
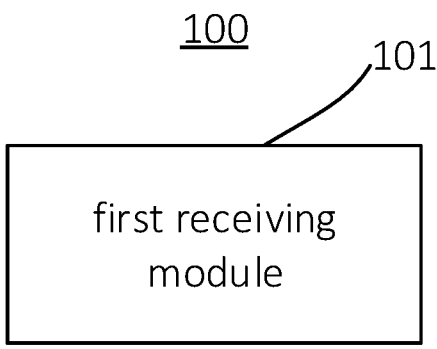
FIG. 9 is a block diagram illustrating a communication device according to some embodiments.

FIG. 9 is a block diagram illustrating a communication apparatus 100 according to some embodiments. As illustrated in FIG. 9, the apparatus includes a first receiving module 101.

The first receiving module 101 is configured to receive first control information sent by a source base station, in which the first control information is configured to indicate a multi-modal service parameter of a multi-model service that a target base station supports the UE to hand over to access the target base station to perform.

In embodiments of the disclosure, the communication apparatus is further configured to send by the UE, measurement reporting information in response to satisfying a measurement reporting trigger condition of the source base station. The measurement reporting information at least includes information configured to indicate one or more target base stations satisfying the measurement reporting trigger condition.

In embodiments of the disclosure, the measurement reporting trigger condition includes: finding a target base station satisfying a handover condition.

In embodiments of the disclosure, the first control information sent by the source base station is determined by the source base station based on multi-modal service response information from the target base station; in which the multi-modal service response information from the target base station is determined by the target base station based on the multi-modal service handover information received from and sent by the source base station.

In embodiments of the disclosure, the multi-modal service handover information sent by the source base station at least includes a handover request signaling for the UE to perform a multi-modal service handover.

In embodiments of the disclosure, the handover request signaling (Handover Request) at least includes UE content information (UEContextInformation), in which the UEContextInformation at least includes a signaling element configured to instruct the UE to perform the multi-modal service; or handover preparation information (HandoverPreparationInformation), in which the HandoverPreparationInformation at least includes a signaling element configured to instruct the UE to perform the multi-modal service.

In embodiments of the disclosure, the multi-modal service response information at least includes: a handover response identifier configured to indicate the multi-modal service supported by the target base station.

In embodiments of the disclosure, the multi-modal service response information at least includes handover request acknowledge information (HANDOVER REQUEST ACKNOWLEDGE) configured to indicate that the target base station supports the multi-modal service, and the multi-modal service response information further comprises information about one or more types of one or more multi-modal services supported by the target base station.

In embodiments of the disclosure, the multi-modal service response information at least includes handover preparation failure (HANDOVER PREPARATION FAILURE) configured to indicate that the target base station does not support the multi-modal service.

In embodiments of the disclosure, the first control information sent by the source base station is Radio Resource Control Reconfiguration (RRCReconfiguration) information.

Figure 10:
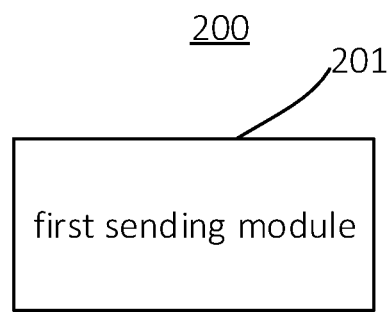
FIG. 10 is a block diagram illustrating another communication device according to some embodiments.

FIG. 10 is a block diagram illustrating a communication apparatus 200 according to some embodiments. As illustrated in FIG. 10, the apparatus includes a first sending module 201.

The first sending module 201 is configured to send multi-modal service handover information to a target base station. The multi-modal service handover information is configured to determine a multi-modal service parameter of a multi-modal service performed by user equipment (UE) and associated with the target base station.

In embodiments of the disclosure, the first sending module 201 is further configured to send first control information to the UE in response to receiving multi-modal service response information from the target base station. The first control information is configured to indicate a multi-modal service parameter of a multi-modal service that the target base station supports UE to hand over to access the target base station to perform.

In embodiments of the disclosure, the communication apparatus is further configured to receive measurement reporting information sent by the UE, in which the measurement reporting information at least includes information configured to indicate one or more target base stations satisfying a measurement reporting triggering condition.

In embodiments of the disclosure, the measurement reporting trigger condition includes: finding a target base station satisfying a handover condition.

In embodiments of the disclosure, the multi-modal service response information from the target base station is determined by the target base station based on the multi-modal service handover information received from and sent by the source base station.

In embodiments of the disclosure, the multi-modal service handover information sent by the source base station at least includes a handover request (Handover Request) signaling for the UE to perform a multi-modal service handover.

In embodiments of the disclosure, the handover request (Handover Request) signaling at least includes UE content information (UEContextInformation), in which the UEContextInformation at least includes a signaling element configured to instruct the UE to perform the multi-modal service; or handover preparation information (HandoverPreparationInformation), in which the HandoverPreparationInformation at least includes a signaling element configured to instruct the UE to perform the multi-modal service.

In embodiments of the disclosure, the multi-modal service response information at least includes: a handover response identifier configured to indicate the multi-modal service supported by the target base station.

In embodiments of the disclosure, the multi-modal service response information at least includes handover request acknowledge information (HANDOVER REQUEST ACKNOWLEDGE) configured to indicate that the target base station supports the multi-modal service, and the multi-modal service response information further includes information about one or more types of one or more multi-modal services supported by the target base station.

In embodiments of the disclosure, the multi-modal service response information at least includes handover preparation failure (HANDOVER PREPARATION FAILURE) configured to indicate that the target base station does not support the multi-modal service.

In embodiments of the disclosure, the first control information sent by the source base station is Radio Resource Control Reconfiguration (RRCReconfiguration) information.

Figure 11:
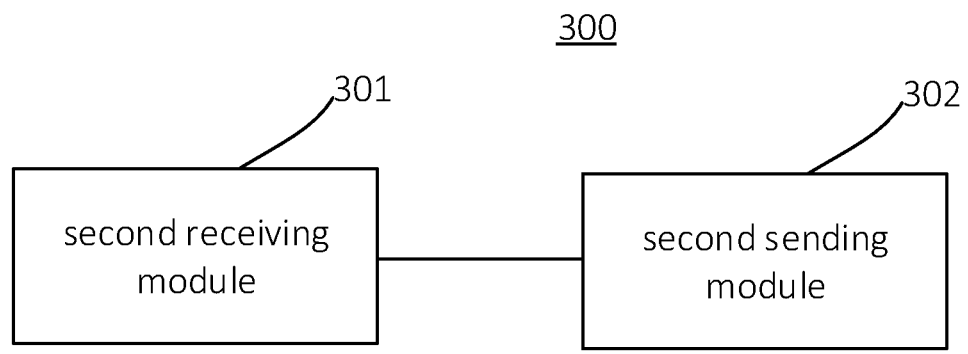
FIG. 11 is a block diagram illustrating yet another communication device according to some embodiments.

FIG. 11 is a block diagram illustrating a communication apparatus 300 according to some embodiments. As illustrated in FIG. 11, the apparatus includes a second receiving module 301 and a second sending module 302.

The second receiving module 301 is configured to receive multi-modal service handover information sent by a source base station. The multi-modal service handover information is configured to determine a multi-modal service parameter of a multi-modal service performed by user equipment (UE) and associated with a target base station. The second sending module is configured to send multi-modal service response information.

In embodiments of the disclosure, the multi-modal service handover information sent by the source base station at least includes a handover request (Handover Request) signaling for the UE to perform a multi-modal service handover.

In embodiments of the disclosure, the handover request (Handover Request) signaling at least includes UE content information (UEContextInformation), in which the UEContextInformation at least includes a signaling element configured to instruct the UE to perform the multi-modal service; or handover preparation information (HandoverPreparationInformation), in which the HandoverPreparationInformation at least includes a signaling element configured to instruct the UE to perform the multi-modal service.

In embodiments of the disclosure, the multi-modal service response information at least includes: a handover response identifier configured to indicate the multi-modal service supported by the target base station.

In embodiments of the disclosure, the multi-modal service response information at least includes handover request acknowledge information (HANDOVER REQUEST ACKNOWLEDGE) configured to indicate that the target base station supports the multi-modal service, and the multi-modal service response information further includes information about one or more types of one or more multi-modal services supported by the target base station.

In embodiments of the disclosure, the multi-modal service response information at least includes handover preparation failure (HANDOVER PREPARATION FAILURE) configured to indicate that the target base station does not support the multi-modal service.

Regarding the apparatuses in the above-mentioned embodiments, the specific manner in which each module performs operations has been described in detail in the embodiments of the methods, and will not be described in detail here.

Figure 12:
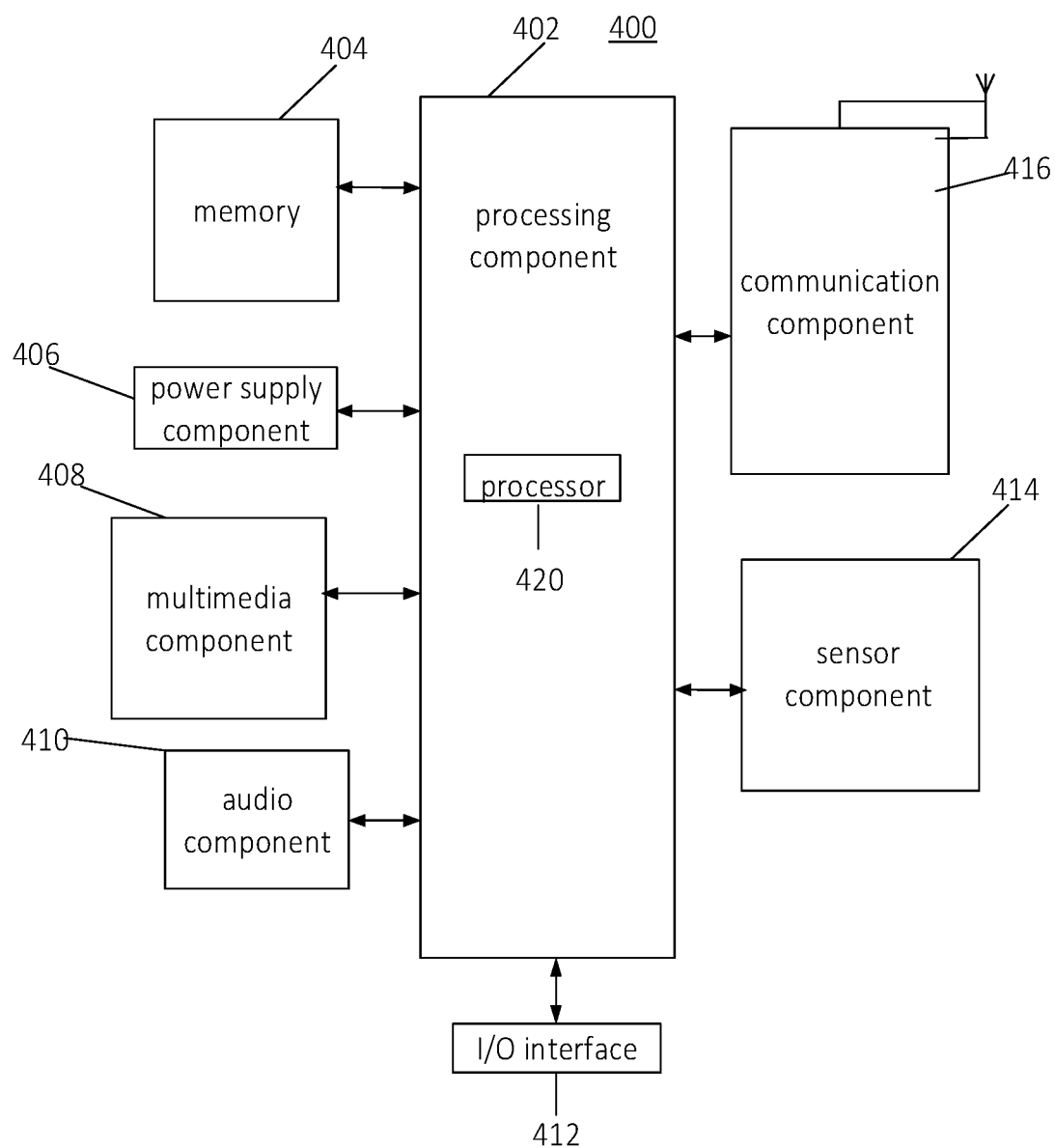
FIG. 12 is a block diagram illustrating a communication device according to some embodiments.

FIG. 12 is a block diagram illustrating a communication device according to some embodiments. For example, the device 400 may be a mobile phone, a computer, a digital broadcast terminal, a messaging device, a game console, a tablet device, a medical device, a fitness device, a personal digital assistant, and the like.

As illustrated in FIG. 12, the device 400 may include one or more of the following components: a processing component 402, a memory 404, a power supply component 406, a multimedia component 408, an audio component 410, an input/output (I/O) interface 412, a sensor component 414, and a communication component 416.

The processing component 402 generally controls the overall operation of the device 400, such as operations associated with display, phone calls, data communications, camera operations, and recording operations. The processing component 402 can include one or more processors 420 to execute instructions to perform all or some of the steps of the methods described above. Additionally, processing component 402 may include one or more modules that facilitate interaction between processing component 402 and other components. For example, processing component 402 may include a multimedia module to facilitate interaction between multimedia component 408 and processing component 402.

The memory 404 is configured to store various types of data to support operations of the device 400. Examples of such data include instructions for any application or method operating on the device 400, contact data, phonebook data, messages, pictures, videos, and the like. The memory 404 may be implemented by any type of volatile or non-volatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic Disk or Optical Disk.

The power supply component 406 provides power to various components of the device 400. The power supply component 406 may include a power management system, one or more power supplies, and other components associated with generating, managing, and distributing power to the device 400.

The multimedia component 408 includes a screen that provides an output interface between the device 400 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. The touch sensors can sense not only the boundaries of a touch or swipe action, but also the duration and pressure associated with the touch or swipe action. In some embodiments, the multimedia component 408 includes a front-facing camera and/or a rear-facing camera. When the device 400 is in an operation mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 410 is configured to output and/or input audio signals. For example, audio component 410 includes a microphone (MIC) that is configured to receive external audio signals when the device 400 is in operating modes, such as call mode, recording mode, and voice recognition mode. The received audio signal may be further stored in the memory 404 or transmitted via the communication component 416. In some embodiments, the audio component 410 also includes a speaker for outputting audio signals.

The I/O interface 412 provides an interface between the processing component 402 and a peripheral interface module, which may be a keyboard, a click wheel, a button, and the like. These buttons may include, but are not limited to: home button, volume buttons, start button, and lock button.

The sensor component 414 includes one or more sensors for providing status assessment of various aspects of the device 400. For example, the sensor component 414 can detect the on/off state of the device 400, the relative positioning of components, such as the display and keypad of the device 400, the sensor component 414 can also detect a change in the position of the device 400 or a component of the device 400, the presence or absence of contact with the device 400, the orientation or acceleration/deceleration of the device 400 and the temperature change of the device 400. The sensor component 414 may include a proximity sensor configured to detect the presence of nearby objects in the absence of any physical contact. The sensor component 414 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 416 is configured to facilitate wired or wireless communication between the device 400 and other devices. The communication apparatus 300 may access a wireless network based on a communication standard, such as Wi-Fi, 2G or 3G, or a combination thereof. In one embodiment, the communication component 416 receives broadcast signals or broadcast related information from an external broadcast management system via a broadcast channel. In an embodiment, the communication component 416 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 400 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component implementation for performing the above method.

In some embodiments, there is further provided a non-transitory computer-readable storage medium including instructions, such as the memory 404 including instruction. The instruction are executed by a processor 420 of the device 400 to execute the above-mentioned method. For example, the non-transitory computer-readable storage medium may be ROM, random access memory (RAM), CD-ROM, tape, floppy disk, optical data storage device or the like.

Figure 13:
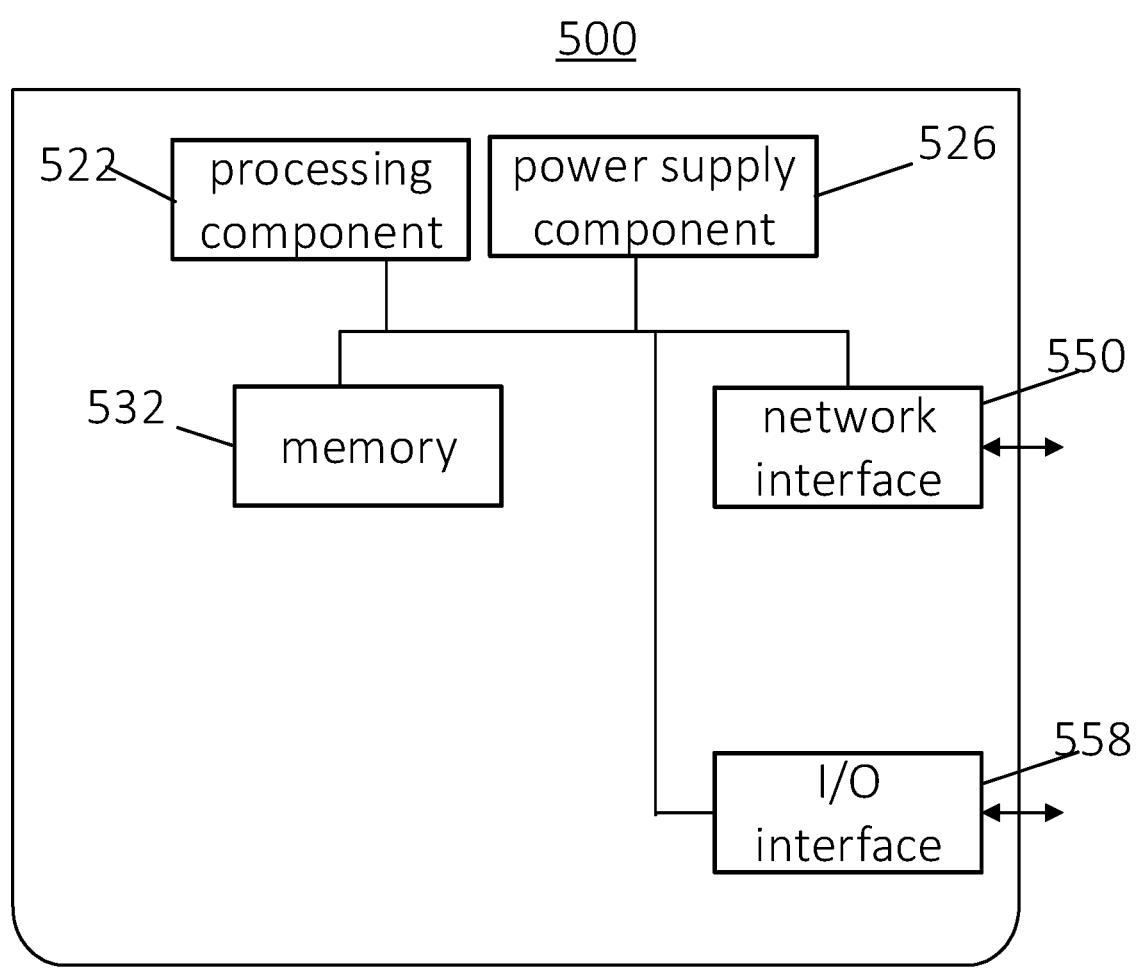
FIG. 13 is a block diagram illustrating a communication device according to some embodiments.

FIG. 13 is a block diagram illustrating a communication device 500 according to some embodiments. For example, the device 500 may be a server. As illustrated in FIG. 13, the device 500 includes a processing component 522, which further includes one or more processors, and a memory resource represented by a memory 532 for storing instructions executable by the processing component 522, such as an application program. The application program stored in the memory 532 may include one or more modules, each corresponding to a set of instructions. Additionally, the processing component 522 is configured to execute instructions to perform the above-described communication methods.

The device 500 may include a power component 526 configured to perform power management of the device 500, a wired or wireless network interface 550 configured to connect the device 500 to the network, and an input/output (I/O) interface 558. The device 500 may operate based on an operating system stored in the memory 532, such as Windows Server™, Mac OS X™, Unix™, Linux™, FreeBSD™ or the like.

The technical solutions according to embodiments of the disclosure may provide the following beneficial effects. By receiving the first control information sent by the source base station, the multi-modal service parameter of a multi-modal service that a target base station supports the UE to hand over to access the target base station to perform is determined, to further determine the multi-modal services performed by the UE and supported by the target base station. Therefore, the multi-modal function is realized and one or more requirements of the same UE or one or more requirements of different UEs can be met.

It is understandable that in the disclosure, "plurality" refers to two or more, and other quantifiers are similar. The term "and/or" describes the association relationship of the associated objects and means that there can be three kinds of relationships. For example, A and/or B means only A, only B, or both A and B. The character "/" generally indicates that the associated objects are an "or" relationship. The singular forms "a," "the," and "an" are intended to include the plural forms as well, unless the context clearly dictates otherwise.

It is further understandable that the terms "first", "second", etc. are used to describe various information, but the information should not be limited to these terms. These terms are only used to distinguish the same type of information from one another, and do not imply a particular order or level of importance. In fact, the expressions "first", "second" etc. can be used interchangeably. For example, the first information may also be referred to as the second information, and similarly, the second information may also be referred to as the first information, without departing from the scope of the disclosure.

It is further understandable that, although the operations in the embodiments of the disclosure are described in a specific order in the drawings, it should not be construed as requiring that the operations be performed in the specific order shown or the serial order, or requiring to perform all operations shown to obtain the desired result. In certain circumstances, multitasking and parallel processing may be advantageous.

Other embodiments of the disclosure will readily occur to those skilled in the art upon consideration of the specification and practice of the disclosure disclosed herein. This disclosure is intended to cover any variations, uses, or adaptations of the disclosure that follow the general principles of the disclosure and include common knowledge or techniques in the technical field not disclosed by the disclosure. The specification and examples are to be regarded as example only, with the true scope and spirit of the disclosure being indicated by the following claims.

It is understandable that the disclosure is not limited to the precise structures described above and illustrated in the accompanying drawings, and that various modifications and changes may be made without departing from the scope thereof. The scope of the disclosure is limited only by the appended claims.

What is claimed is:

1. A communication method, performed by user equipment (UE), the method comprising:
receiving first control information sent by a source base station, wherein the first control information is configured to indicate a multi-modal service parameter of a multi-modal service, wherein a target base station supports a handover from the source base station to the target base station for the UE to perform the multi-modal service;
wherein the first control information sent by the source base station is determined by the source base station based on multi-modal service response information from the target base station; wherein the multi-modal service response information from the target base station is determined by the target base station based on multi-modal service handover information received from and sent by the source base station;
wherein the multi-modal service handover information at least comprises a handover request signaling for the UE to perform a multi-modal service handover; or wherein the multi-modal service response information at least comprises: a handover response identifier configured to indicate the multi-modal service supported by the target base station.

2. The communication method of claim 1, further comprising:
sending by the UE, measurement reporting information in response to satisfying a measurement reporting trigger condition of the source base station, wherein the measurement reporting information at least comprises information configured to indicate one or more target base stations satisfying the measurement reporting trigger condition.

3. The communication method of claim 2, wherein the measurement reporting trigger condition comprises: finding a target base station satisfying a handover condition.

4. The communication method of claim 1, wherein the handover request signaling at least comprises:
UE content information (UEContextInformation), wherein the UEContextInformation at least comprises a signaling element configured to instruct the UE to perform the multi-modal service; or
handover preparation information (HandoverPreparationInformation), wherein the HandoverPreparationInformation at least comprises a signaling element configured to instruct the UE to perform the multi-modal service.

5. The communication method of claim 1, wherein the multi-modal service response information at least comprises:
handover request acknowledge information (HANDOVER REQUEST ACKNOWLEDGE) configured to indicate that the target base station supports the multi-modal service, and the multi-modal service response information further comprises information about one or more types of one or more multi-modal services supported by the target base station.

6. The communication method of claim 1, wherein the multi-modal service response information at least comprises:
handover preparation failure (HANDOVER PREPARATION FAILURE) configured to indicate that the target base station does not support the multi-modal service.

7. The communication method of claim 1, wherein the first control information sent by the source base station is Radio Resource Control Reconfiguration RRCReconfiguration) information.

8. A communication method, performed by a source base station, comprising:
sending multi-modal service handover information to a target base station; wherein the multi-modal service handover information is configured to determine a multi-modal service parameter of a multi-modal service performed by user equipment (UE) and associated with the target base station;
sending first control information to the UE in response to receiving multi-modal service response information from the target base station, wherein the first control information is configured to indicate a multi-modal service parameter of a multi-modal service, wherein the target base station supports a handover from the source base station to the target base station for the UE to perform the multi-modal service;

wherein the multi-modal service handover information at least comprises a handover request signaling for the UE to perform a multi-modal service handover; or wherein the multi-modal service response information at least comprises: a handover response identifier configured to indicate the multi-modal service supported by the target base station.

9. The communication method of claim 8, further comprising:
receiving measurement reporting information sent by the UE, wherein the measurement reporting information at least comprises information configured to indicate one or more target base stations satisfying a measurement reporting triggering condition.

10. A communication method, performed by a target base station, the method comprising:
receiving multi-modal service handover information sent by a source base station; wherein the multi-modal service handover information is configured to determine a multi-modal service parameter of a multi-modal service performed by user equipment (UE) and associated with a target base station; and
sending multi-modal service response information;
wherein the multi-modal service handover information at least comprises a handover request signaling for the UE to perform a multi-modal service handover; or wherein the multi-modal service response information at least comprises: a handover response identifier configured to indicate the multi-modal service supported by the target base station.

11. The communication method of claim 10, wherein the handover request signaling at least comprises:
UE content information (UEContextInformation), wherein the UEContextInformation at least comprises a signaling element configured to instruct the UE to perform the multi-modal service;
or
handover preparation information (HandoverPreparationInformation), wherein the HandoverPreparationInformation at least comprises a signaling element configured to instruct the UE to perform the multi-modal service.

12. A communication device, comprising:
a processor; and
a memory for storing instructions executable by the processor;
wherein, the processor is configured to perform the communication method of claim 1.

13. A communication device, comprising:
a processor; and
a memory for storing instructions executable by the processor;
wherein, the processor is configured to perform the communication method of claim 8.

14. A communication device, comprising:
a processor; and
a memory for storing instructions executable by the processor;
wherein, the processor is configured to perform the communication method of claim 10.

* * * * *